No. 884,416. PATENTED APR. 14, 1908.
R. E. POINDEXTER.
SOD TRIMMER.
APPLICATION FILED NOV. 7, 1907.
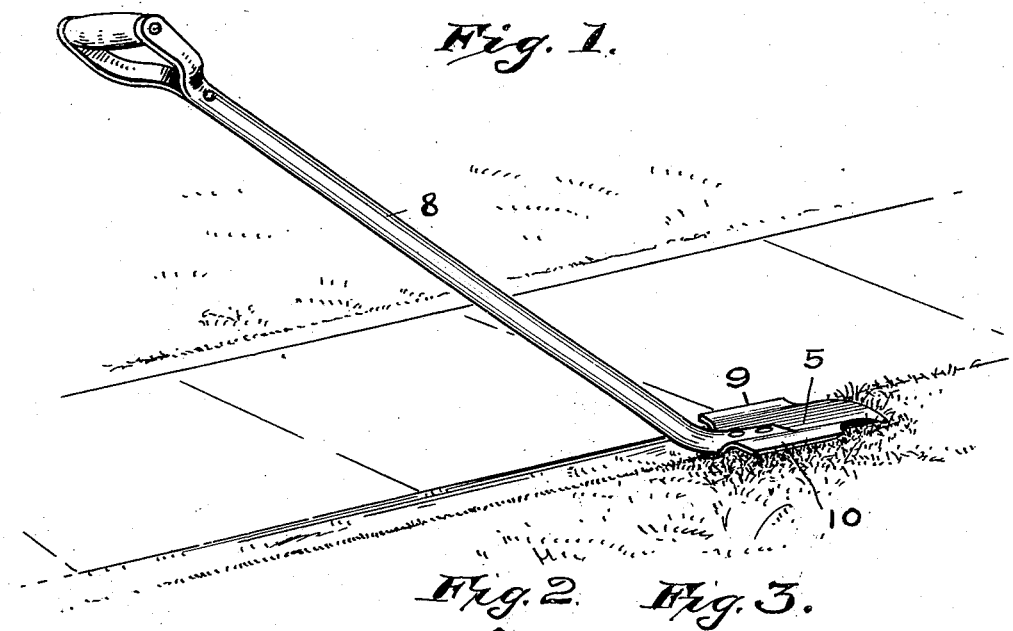
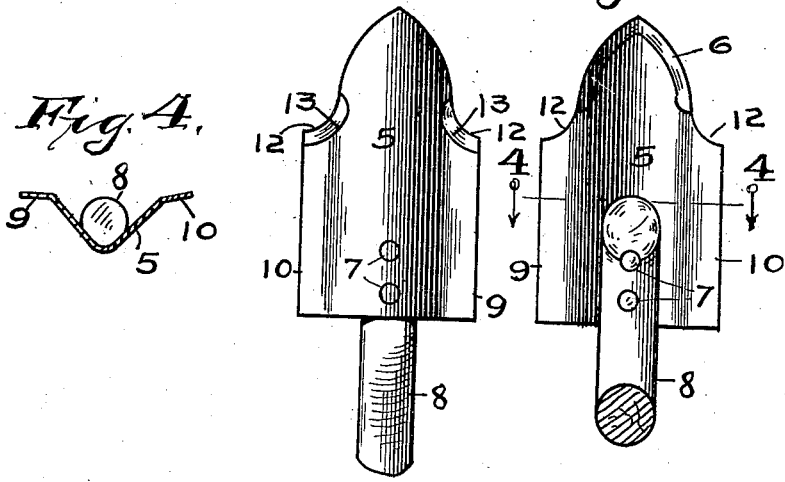
WITNESSES:
L. B. Worner.
Wm Hurte.
INVENTOR:
Robert E. Poindexter
By Minturn & Worner,
Attorneys.

UNITED STATES PATENT OFFICE.

ROBERT E. POINDEXTER, OF INDIANAPOLIS, INDIANA.

SOD-TRIMMER.

No. 884,416.  Specification of Letters Patent.  Patented April 14, 1908.

Application filed November 7, 1907. Serial No. 401,090.

*To all whom it may concern:*

Be it known that I, ROBERT E. POINDEXTER, a citizen of the United States, residing at Indianapolis, in the county of Marion and State of Indiana, have invented certain new and useful Improvements in Sod-Trimmers, of which the following is a specification.

This invention relates to improvements in tools for cutting the sod and grass away from the edges of side-walks and for removing the soil to form a shallow ditch or furrow of uniform width and depth next to the walk.

The object of the invention is to provide a tool or implement for the above purpose which can be operated without much effort and which will be self gaging, and which will follow the margin of the walk by the natural tendency of the tool.

The object also is to provide a tool which will be simple in its construction and operation, and cheap in its manufacture.

I accomplish the objects of my invention by the mechanism illustrated in the accompanying drawing, in which—

Figure 1 is a perspective view of my improved tool as it would appear in use for cutting a furrow along the edge of a concrete or a stone side-walk. Fig. 2 is a detail in under side view of the shovel or cutting end of my tool. Fig. 3 is the obverse or top view of the same portion of the tool that is shown in Fig. 2, and Fig. 4 is a cross section on the line 4—4 of Fig. 3 looking in the direction of the arrows.

Like characters of reference indicate like parts throughout the several views of the drawings.

5 represents the shovel or body portion of my tool and comprises a blade of steel which is dished or concaved longitudinally, as shown, and is made tapering to a point in the mid-line of the blade at the front end of the latter. This front end has its edges sharpened by beveling off the edges on the upper side of the blade. It is essential that this sharpening or bevel be on the upper side of the blade so as to cause the tool to sink into the earth as it is pushed forward. This sharpening or bevel is shown at 6.

Attached to the rear end of the blade or shovel 5, here shown as by means of the rivets 7, is the handle 8, which will preferably be a D-handle as shown, on account of the greater facility which this style of handle affords to the workman in operating the tool. It is not desired however to limit the invention to this style of handle.

On each side of the blade 5, extending from rear toward the front cutting edge, are the guiding wings 9 and 10 which are for the purpose of gaging the depth to which the blade may enter the sod and soil. The wing 9 is intended to contact with the top surface of the side-walk, and the ring 10 with the top of the sod, and it is obvious that these two members will determine the depth to which the blade or shovel 5 may penetrate. It will be noted that the wing 9 occupies an approximately horizontal position, and it also will be noted that the wing 10 is oblique to the plane of the wing 9, the outer edge of the wing 10 being elevated. While this elevation of the outer edge of wing 10 is not essential, it is thought to be preferable to facilitate the movement of the implement over the grass of the sod by providing more room to prevent crowding up of the blade on that side, particularly when the grass is long. In order to lessen the resistance and obstruction of the shoulder or end of the wings at their front portions I form these ends on a curved line 12, the reverse in curvature of the adjacent edge of the point 5. This edge 12 is sharpened on its under side as shown by the bevel 13 in Fig. 2.

Having thus fully described my invention what I claim as new and wish to secure by Letters Patent of the United States, is—

1. A tool for the purposes specified, comprising a concave metal blade sharpened to a point in front, wings projecting outwardly from the longitudinal edges of the blade the front ends of said wings being curved in a reverse direction to the curve of the blade-point, and a handle secured to the blade.

2. A tool for the purposes specified, comprising a concave metal blade pointed in front and sharpened by beveling the top face of said pointed end, gages formed by bending in an outward direction wings formed along the longitudinal edges of the blade, the front ends of said wings being sloped inwardly and forwardly and sharpened on their under sides, and a handle secured to the blade.

3. A tool for the purpose specified, comprising a metal plate bent longitudinally into a V-shape in cross section, the front end of said bent blade being tapered to a middle point and sharpened on the upper face of the plate, gages extending along each longitudinal edge of the blade thus formed and comprising integral wings which are bent outwardly into an approximately horizontal plane, the front ends of said wings being curved in a reverse direction from the curve of said point and being sharpened on their lower faces, and a bent handle secured to the rear of the blade.

In witness whereof, I, have hereunto set my hand and seal at Indianapolis, Indiana, this, 30th day of October, A. D. one thousand nine hundred and seven.

ROBERT E. POINDEXTER. [L. S.]

Witnesses:
J. A. MINTURN.
F. W. WOERNER.